US012118800B2

(12) United States Patent
Cao et al.

(10) Patent No.: US 12,118,800 B2
(45) Date of Patent: Oct. 15, 2024

(54) MULTIPLE HYPOTHESIS-BASED FUSION OF SENSOR DATA

(71) Applicant: Aptiv Technologies AG, Schaffhausen (CH)

(72) Inventors: Nianxia Cao, Oak Park, CA (US); Xiaohui Wang, Oak Park, CA (US)

(73) Assignee: Aptiv Technologies AG, Schaffhausen (CH)

( * ) Notice: Subject to any disclaimer, the term of this patent is extended or adjusted under 35 U.S.C. 154(b) by 401 days.

(21) Appl. No.: 17/643,808

(22) Filed: Dec. 10, 2021

(65) Prior Publication Data

US 2022/0262129 A1 Aug. 18, 2022

Related U.S. Application Data

(60) Provisional application No. 63/149,526, filed on Feb. 15, 2021.

(51) Int. Cl.
*G06V 20/58* (2022.01)
*G06T 7/20* (2017.01)
*G06V 10/80* (2022.01)

(52) U.S. Cl.
CPC ............... *G06V 20/58* (2022.01); *G06T 7/20* (2013.01); *G06V 10/80* (2022.01);
(Continued)

(58) Field of Classification Search
CPC .......... G06T 7/20; G06T 7/292; G06T 7/277; G06T 7/246; G06T 7/251;
(Continued)

(56) References Cited

U.S. PATENT DOCUMENTS

| 10,565,468 B2 | 2/2020 | Schiffmann | |
| 2014/0032167 A1* | 1/2014 | Mayer | G01D 21/00 |
| | | | 702/179 |
| 2017/0206436 A1* | 7/2017 | Schiffmann | G01S 13/931 |

FOREIGN PATENT DOCUMENTS

EP 3330742 A1 6/2018

OTHER PUBLICATIONS

"Extended European Search Report", EP Application No. 22150640. 5, Jun. 7, 2022, 10 pages.
(Continued)

*Primary Examiner* — Vincent Rudolph
*Assistant Examiner* — Raphael Schwartz
(74) *Attorney, Agent, or Firm* — Harness, Dickey & Pierce, P.L.C.

(57) ABSTRACT

This document describes a multiple hypothesis-based data fusion tracker. Each hypothesis aligns to a different pseudo measurement type. The fusion tracker automatically determines, using a predefined error covariance associated with the radar, which pseudo measurement type has a greater chance of being accurate for a current situation. The fusion tracker may rely on either one of two combined radar and vision calculations, or the fusion tracker may ignore the vision-based pseudo measurements and instead, rely on radar pseudo measurements alone. By selecting between three different bounding boxes, a vision angle based box, a vision lateral position based box, or a radar only based box, the fusion tracker can balance accuracy and speed when drawing, repositioning, or resizing bounding boxes, even under congested traffic or other high volume situations.

17 Claims, 6 Drawing Sheets

(52) U.S. Cl.
CPC ............... *G06T 2207/10028* (2013.01); *G06T 2207/10044* (2013.01); *G06T 2207/10132* (2013.01); *G06T 2207/30252* (2013.01)

(58) Field of Classification Search
CPC .......... G06T 2207/10044; G06T 2207/10028; G06T 2207/30252; G06V 20/58; G06V 20/56; G06V 2201/07; G06V 10/80; G06V 10/803; G06V 10/811; G01S 13/867; G01S 13/865; G01S 13/862; G01S 13/86; G01S 13/87; G01S 13/872; G01S 13/874; G01S 13/876; G01S 13/878; G01S 17/86; G01S 15/86
See application file for complete search history.

(56) References Cited

OTHER PUBLICATIONS

Duraisamy, et al., "Track Level Fusion Algorithms for Automotive Safety Applications", Feb. 2013, pp. 179-184.

\* cited by examiner

MULTIPLE HYPOTHESIS-BASED FUSION OF SENSOR DATA

CROSS-REFERENCE TO RELATED APPLICATION

This application claims the benefit under 35 U.S.C. 119(e) of U.S. Provisional Application No. 63/149,526, filed Feb. 15, 2021, the disclosure of which is incorporated in its entirety by reference herein.

BACKGROUND

In some automobiles, a sensor-fusion system or so-called "fusion tracker" combines information obtained from multiple sensors to draw bounding boxes around objects that may impede travel. The combined sensor data can better estimate each object's position within a field-of-view (FOV) across a variety of conditions. Resizing or repositioning these bounding boxes often involves using expensive hardware that can correlate low-level tracks and fuse the sensor data with sufficient speed to support computer-decisions for autonomous or semi-autonomous control. Some fusion trackers weigh low-level tracks based on an error covariance. The error covariance is typically obtained from a vision camera and may not be reliable in all driving scenarios. An Extended Kalman Filter (EKF) may be used to reduce the complexity of the data fusion. To maximize performance, an EKF may focus on the sensor data that is most linear; the EKF can miss correlations or appear less accurate forsaking much of the sensor data for speed.

SUMMARY

This document describes multiple hypothesis-based fusion of sensor data. In one example, a method includes determining, by a sensor-fusion system, a plurality of first object-tracks according to first sensor data obtained from a first set of sensors. The method further includes determining, by the sensor-fusion system, a set of second object-tracks according to second sensor data obtained from a second set of sensors. Also included in the method is selecting, from a plurality of pseudo measurement types, a pseudo measurement type that has a greater chance of being accurate than each other pseudo measurement type from the plurality of pseudo measurement types, the selecting based at least in part on a predefined error covariance associated with the first set of sensors. The method further includes using the pseudo measurement type to determine a bounding box represented by the plurality of first object-tracks and the set of second object-tracks. The method follows with outputting an indication of the bounding box as a match between one or more object-tracks from the plurality of first object-tracks with at least one object-track from the set of second object-tracks.

In one example, a system includes a processor configured to perform this and other methods set forth herein. In another example, a system is described including means for performing this and other methods. This document also describes non-transitory computer-readable storage mediums having instructions that, when executed, configured a processor to perform the above-summarized method and other methods set forth herein.

This summary introduces simplified concepts of multiple hypothesis-based fusion of sensor data, which are further described below in the Detailed Description and Drawings. This summary is not intended to identify essential features of the claimed subject matter, nor is it intended for use in determining the scope of the claimed subject matter. Although primarily described in the context of improving fusion tracker matching algorithms, multiple hypothesis-based fusion of sensor data can be applied to other applications where matching multiple low-level tracks at with a high-rate of speed is desired.

BRIEF DESCRIPTION OF THE DRAWINGS

The details of one or more aspects of multiple hypothesis-based fusion of sensor data are described in this document with reference to the following figures. The same numbers are often used throughout the drawings to reference like features and components.

FIGS. 4-1 and 4-2 illustrate example pseudo bounding boxes defined under multiple hypothesis-based fusion of sensor data, in accordance with techniques of this disclosure.

DETAILED DESCRIPTION

Overview

Determining high-level matchings between different sensor tracks (e.g., radar, vision camera, lidar) can be challenging. A bounding box around a single object may correspond to one or more low-level object-tracks, which have been fused from multiple sensors with overlapping or nearly adjacent FOVs. In a congested scene where multiple objects are identifiable in a combine FOV, the fusion tracker may underperform trying to size and position bounding boxes around multiple nearby objects. The accuracy of these bounding boxes may be suspect. Before relying on the data, some fusion trackers may weigh object-tracks based on an error covariance, which is obtained from a vision camera. As a practical matter, however, this error covariance is not always reliable for fusion tracking. An EKF can help performance, but to improve speed, much of the low-level track data is unused, which does not serve to improve bounding-box accuracy.

A sensor may output pseudo measurements to help a fusion tracker compute a position and dimension of a bounding box assigned to an object. The pseudo measurements can have varying degrees of accuracy; pseudo measurements output from a vision camera may be less accurate, than, for example, radar. A range or longitudinal position that is output from a vision camera may be unusable in a forward driving scenario. Even so, a vision angle or a vision based lateral position may be sufficient for most situations and can aid in positioning a bounding box to a correct reference point. On the other hand, a radar may be even more reliable and accurate for range and bounding box calculations than even these vision-based pseudo states. Therefore, there are multiple hypotheses to consider when evaluating whether a pseudo measurement from a particular type of sensor should be used or not for relative positioning estimations.

In accordance with techniques and systems of this disclosure, a multiple hypothesis-based data fusion tracker is described. Each hypothesis aligns to a different pseudo measurement type. The fusion tracker automatically determines, using a predefined error covariance associated with the radar, which pseudo measurement type has a greater chance of being accurate for a current situation. The fusion tracker may rely on either one of two combined radar and vision calculations, or the fusion tracker may ignore the vision-based pseudo measurements and instead, rely on radar pseudo measurements alone. By selecting between three different bounding boxes, a vision angle based box, a vision lateral position based box, or a radar only based box, the fusion tracker can balance accuracy and speed when drawing, repositioning, or resizing bounding boxes, even under congested traffic or other high volume situations.

Example Environment

Figure 1:
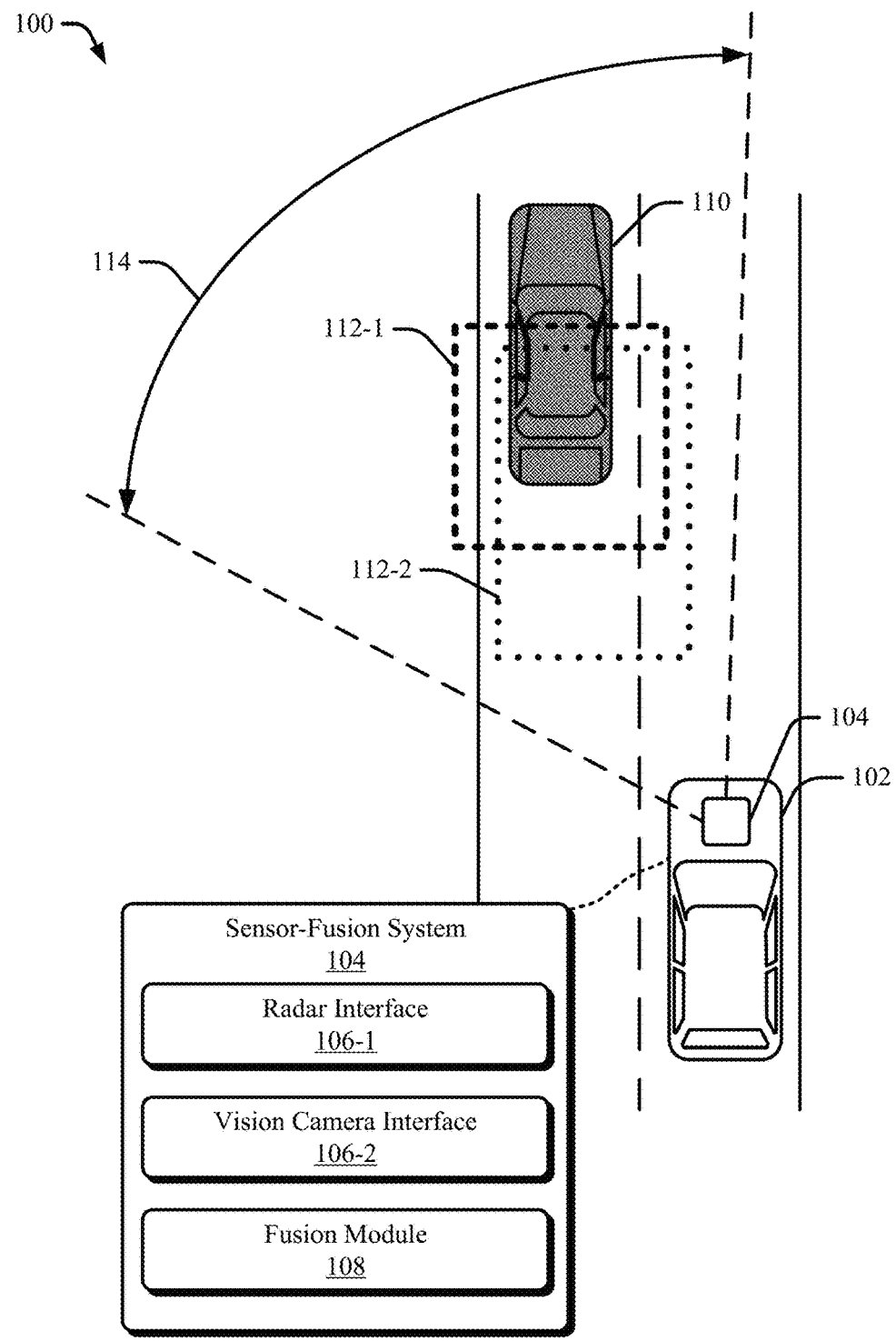
FIG. 1 illustrates an example environment in which a system is configured to perform multiple hypothesis-based fusion of sensor data, in accordance with techniques of this disclosure.

FIG. 1 illustrates an example environment 100 in which a system 102 is configured to perform multiple hypothesis-based fusion of sensor data, in accordance with techniques of this disclosure. In the depicted environment 100, the system 102 is an automobile. Sometimes also referred to as a vehicle 102, the system 102 can represent any type apparatus or machinery including manned and unmanned systems that may be used for a variety of purposes. Some non-exhaustive and non-limiting examples of the vehicle 102 include a motorcycle, a bus, a tractor, a semi-trailer truck, watercraft, aircraft, or other equipment or machine.

Objects may be located in proximity to the vehicle 102, for example, FIG. 1 depicts another vehicle 110 traveling in front of and in the same direction as the vehicle 102. With the sensor-fusion system 104, the vehicle 102 has an instrument FOV 114 that encompasses the other vehicle 110. The sensor-fusion system 104 can capture the FOV 114 from any exterior surface of the vehicle 102. Manufacturers can position the radar and vision camera components that interface to the sensor-fusion system 104 to cause the sensor-fusion system 104 to have a particular FOV. For example, positioning the radar and/or vision cameras a certain way can ensure the FOV of the sensor-fusion system 104 includes areas above, adjacent to, or on a road on which the vehicle 102 may be traveling. Manufacturers can integrate at least a part of the sensor-fusion system 104 into a side mirror, bumper, roof, or any other part of the vehicle 102.

The sensor-fusion system 104 includes a fusion module 108 and one or more sensor interfaces 106, which includes a radar interface 106-1 and a vision camera interface 106-2. Although not precisely shown in FIG. 1, the fusion module 108 executes on a processor or other hardware. During execution, the fusion module 108 can track objects based on sensor data obtained at the radar interface 106-1 and the vision camera interface 106-2. The radar interface 106-1 receives radar data from at least one radar of the vehicle 102 and the vision camera receives camera data from one or more vision cameras of the vehicle 102. The fusion module 108 of the sensor-fusion system 104 accesses the radar interface 106-1 and the vision camera interface 106-2 to obtain radar data and vision camera data, respectively. As will be appreciated from other parts of this description, the sensor-fusion system may include additional sensor interfaces 106 (e.g., lidar) than those shown in FIG. 1.

The fusion module 108 configures the sensor-fusion system 104 to combine the different types of sensor data obtained from the sensor interfaces 106 into an object-track, bounding box 112-1, 112-2, or other usable form for tracking objects in the FOV 114. The sensor fusion module 108 generates bounding boxes 112-1 and 112-2, which are each (conceptually) indicative of an estimated size, shape, and relative position of the other vehicle 110, compared to the vehicle 102. The fusion module 108 determines a plurality of object-tracks according to first sensor data (e.g., obtained from the radar interface 106-1), and identifies a set of object-tracks according to second sensor data (e.g., obtained from the vision camera interface 106-2). The bounding box 112-1 corresponds to an estimated size and position of the other vehicle 110 given information inferred from one or more radar object-tracks included in the radar data obtained at the radar interface 106-1. From the vision camera interface 106-2, the bounding box 112-2 is generated based on vision camera object-tracks to estimate size and position of the other vehicle 110.

The bounding box 112-1 and the bounding box 112-1 are offset; or in other words, the two bounding boxes 112-1, 112-2 are tracking the other vehicle 110 as two different objects that have a unique size, shape, and relative position to the vehicle 102. The bounding boxes 112-1, 112-2 appear separate, even though both are tracking to the same vehicle 110. The fusion module 108 is ultimately concerned with correlating the bounding box 112-1 with the bounding box 112-2 so they appear similarly size, shaped, and positioned to correspond to the same part of the same vehicle 110, rather than track and follow different parts of one or two different vehicles.

To correlate the radar data with the vision camera data, the fusion module 108 executes a sensor fusion process that matches low-level object-tracks that appear in the radar data with corresponding low-level object-tracks appearing in the vision camera data. Each object-track inferred from the first sensor data and the second sensor data is associated with an object in the FOV 114, for example, the other vehicle 110. The fusion module 108 identifies object-tracks from the different sensor interfaces 106 that correspond to the same object. Through interrelating the sensor data obtained at two or more of the interfaces 106, the fusion module 108 produce an accurate representation of the other vehicle 110, or part thereof, as a single bounding box relative to a position of the vehicle 102. By performing sensor fusion, the sensor-fusion system 104 reliably and accurately tracks objects that need to be avoided, in a variety of driving scenarios. Through fusing or combining sensor data, the fusion module 108 enables the vehicle 102 to accurately track and avoid obstacles within the FOV 114.

When fusing together multiple large sets of candidate object-tracks, the fusion module 108 may generate a feasibility matrix as described in U.S. Pat. No. 10,565,468 to Schiffmann et al. (herein after referred to as "Schiffmann"). In Schiffmann, a sensor-fusion system assigns an identifier to each candidate object-track associated with an object candidate detected using a vision camera, and the sensor-fusion system assigns an identifier to each candidate object-track (e.g., detection) obtained using radar. A feasibility matrix of two dimensions is created; the first dimension represents a total number of columns, with one per each assigned radar identifier. The second dimension represents a total number of rows, with one row per each camera identifier assigned to the camera data. For each combination of camera and radar candidates represented by the feasibility matrix, probabilities are determined.

These probabilities may represent an evidence matrix. The entries of the evidence matrix can be determined based on errors between the vision camera and radar object-tracks, and indicate a degree of confidence or feasibility that object-tracks detected with the vision camera correspond to the same object as the object-tracks maintained due to radar.

For each intersection of a column and a row of a feasibility matrix, an evidence matrix includes a corresponding entry, which may be a value ranging from zero to one hundred percent or some other equivalent numerical value within a range. This value indicates a probability of whether a particular radar and vision camera object-track pair, which map to that intersection of the feasibility matrix, track to the same object.

An EKF or other filter may be applied to the probabilities computed over time. For example, it may be assumed that at least one pair of radar and vision camera detections has a reasonable chance of matching and as such, the EKF can identify combinations of fused object-track to be relied on with the greatest probabilities of occurrence rather than other combinations with probabilities that are too low (e.g., the values do not satisfy a threshold). The proper selection of pseudo measurement type (as described below) can be critical for accurate measurement updates using an EKF because incorrect definition of pseudo bounding boxes causes bad estimates of size, shape, and position of objects being tracked.

Example Architecture

Figure 2:
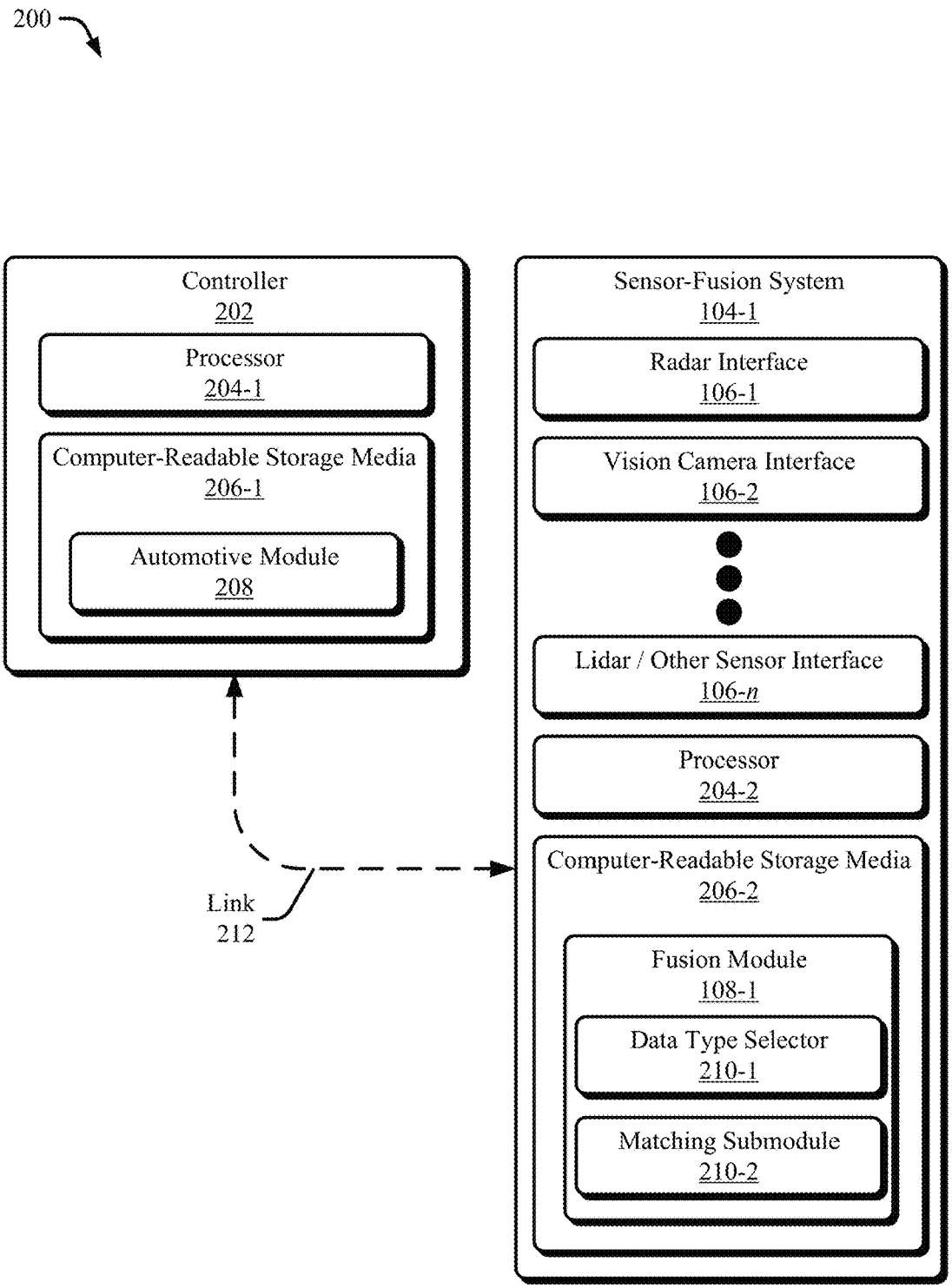
FIG. 2 illustrates an example of an automotive system configured to perform multiple hypothesis-based fusion of sensor data, in accordance with techniques of this disclosure.

FIG. 2 illustrates an example of an automotive system 200 configured to perform multiple hypothesis-based fusion of sensor data, in accordance with techniques of this disclosure. The automotive system 200 can be integrated within the vehicle 102 shown in FIG. 1 and is described in that context. For example, the automotive system 200 includes a controller 202 and a sensor-fusion system 104-1, which is an example of the sensor-fusion system 104. The sensor-fusion system 104-1 and the controller 202 communicate over a link 212. The link 212 may be a wired or wireless link and in some cases includes a communication bus. The controller 202 performs operations based on information received over the link 212, such as an indication of a bounding box output from the sensor-fusion system 104-1 as objects in the FOV are identified from processing and merging object-tracks.

The controller 202 includes a processor 204-1 and a computer-readable storage medium (CRM) 206-1 (e.g., a memory, long-term storage, short-term storage), which stores instructions for an automotive module 208. The sensor-fusion system 104-1 includes the radar interface 106-1 in addition to the vision camera interface 106-2. Any number of other sensor interfaces 106 may be used, including, or excluding a lidar interface or other sensor interface 106-n. The sensor-fusion system 104-1 may include processing hardware that includes a processor 204-2 (e.g., a hardware processor, a processing unit) and a computer-readable storage medium (CRM) 206-2, which stores instructions associated with a fusion module 108-1. The fusion module 108-1, which is an example of the fusion module 108, includes a data type selector submodule 210-1 and a matching submodule 210-2.

The processors 204-1 and 204-2 can be two separate or a single processing unit (e.g., microprocessor) or a pair of or a single system-on-chip of a computing device, a controller, or a control unit. The processors 204-1 and 204-2 execute computer-executable instructions stored within the CRMs 206-1 and 206-2. As an example, the processor 204-1 can execute the automotive module 208 to perform a driving function (e.g., an autonomous lane change maneuver, a semi-autonomous lane-keep feature) or other operation of the automotive system 200. Similarly, the processor 204-2 can execute the fusion module 108-1 to infer objects in the FOV based on sensor data obtained from multiple different sensor interfaces 106 of the system 102. The automotive module 208, when executing at the processor 204-1, can receive an indication of one or more objects detected by the fusion module 108-1 in response to the fusion module 108-1 combining and analyzing sensor data generated at each of the sensor interfaces 106.

Generally, the automotive system 200 executes the automotive module 208 to perform an automotive function using output from the sensor-fusion system 104-1. For example, the automotive module 208 can provide automatic cruise control and monitor for the presence of objects in or near the FOV 114 to slow the speed and prevent a rear-end collision with the vehicle 110. In such an example, the fusion module 108-1 provides sensor data or derivative thereof (e.g., a feasibility matrix) as output to the automotive module 208. The automotive module 208 may provide alerts or cause a specific maneuver when the data obtained from the fusion module 108-1 indicates one or more objects are crossing in front of the vehicle 102.

For ease of simplicity, the data type selector submodule 210-1 and the matching submodule 210-2 are described with reference primarily to the radar interface 106-1 and the vision camera interface 106-2, without reference to the lidar or another sensor interface 106-n. It should be understood, however, that the fusion module 108-1 can combine sensor data from more than just two different categories of sensor and can rely on sensor data output from other types of sensors besides just vision cameras and radar. To further reduce complexity of the description, the matching submodule 210-2 may operate according to a rule that the radar interface 106-1 can detect any vehicle that the vision camera interface 106-2 can detect. In addition, the vision camera interface 106-2 may be configured to produce at most one object-track for each object of interest in the FOV 114; whereas the radar interface 106-1 may be configured to generate several object-tracks for each object of interest in the FOV 114 (e.g., forty or fifty object-tracks in the case of a semi-truck and trailer).

The radar interface 106-1 can operate independent from the vision camera interface 106-2 and may be independently operable from the lidar/other sensor interfaces 106-n. The radar interface 106-1 can maintain a list of "detections" and corresponding detection times, which are assumed to mostly be tracking on scattered centers of vehicles it detects. Each detection typically consists of a range value, a range-rate value, and an azimuth angle value. There is generally more than one detection on each vehicle that is unobstructed in the FOV 114 and at a reasonably close range to the vehicle 102.

Similar to the radar interface 106-1, the vision camera interface 106-2 provides a list of vision-camera-based object-tracks. The vision camera interface 106-2 outputs sensor data, which can be provided in various forms, such as a list of candidate objects being tracked, along with estimates for each of the objects' position, velocity, object class, and reference angles (e.g., an azimuth angle to a "centroid" reference point on the object, such as a center of a rear face of the moving vehicle 110, other "extent angles" to near corners of the rear face of the moving vehicle 110). The vision camera interface 106-2 can estimate azimuth angles and object classifications more accurately than other sensor types, however, the vision camera interface 106-2 may be deficient in estimating some parameters, such as, longitudinal position or range, velocity, and the like. The radar interface 106-1 can accurately-measure object range and range rate but may be less accurate in measuring the azimuth angle, which is where the vision camera is superior. The complementing characteristics of vision cameras and radar leads to accuracy in matching the data between the sensor interfaces 106.

In accordance with techniques of this disclosure, the fusion module 108-1 executes multiple hypothesis-based fusions of sensor data, which seeks to improve performance of fusion tracking without sacrificing accuracy due to ignoring data. Each hypothesis considered by the fusion module 108-1 aligns to a different pseudo measurement type. The fusion tracker 108-1 may automatically determine, using a predefined error covariance associated with the radar interface 106-1, which pseudo measurement type has a greater chance of being accurate for a current situation.

In no particular order, a first pseudo measurement type is a vision camera angle and radar range calculation. A radar range measurement and vision camera angle measurement at a reference point (e.g., a location of the vehicle 102) are used to calculate a corresponding reference point of a pseudo bounding box. A second pseudo measurement type is a vision camera lateral position and radar range calculation. This pseudo measurement leads to a reference point of another pseudo bounding box, this time, calculated from radar range and vision lateral position. A third pseudo measurement type is a radar information only calculation. A pseudo measurement associated with this calculation corresponds to a reference point of a bounding box calculated from radar information alone, including a radar range.

The fusion module 108-1 may rely on either one of two combined radar and vision range calculations, or the fusion module 108-1 may ignore the vision-based pseudo measurements and instead, rely on radar-based pseudo measurements alone. The data type selector submodule 210-1 enhances the speed and efficiency of the matching submodule 210-2 by causing the matching submodule 210-2 to refrain from evaluating some matches that are less likely to be associated with the same object.

The matching submodule 210-2 effectively calculates for each camera-based object-track, the probability that it should be matched to each of a limited number of candidate radar-based candidate object-tracks. The matching submodule 210-2 relates the list of candidate detections produced at the radar interface 106-1 to the list of candidate objects reported at the vision camera interface 106-2. When evaluating the radar-based object-tracks against a vision camera-based object-track, the data type selector submodule 210-1 eliminates some of the guess work otherwise performed by the matching submodule 210-2. Some combinations of radar-based and vision camera-based object-tracks are eliminated rather than evaluated, which enables matching to occur in fewer steps than without the data type selector submodule 210-1. The fusion module 108-1 may generate one or more pseudo bounding boxes using the different pseudo measurement types. By selecting between three different bounding boxes, a vision angle based box, a vision lateral position based box, or a radar only based box, the fusion tracker can balance accuracy and speed when drawing, repositioning, or resizing bounding boxes, even under congested traffic or other high volume situations.

Example Scenarios

Figure 3:
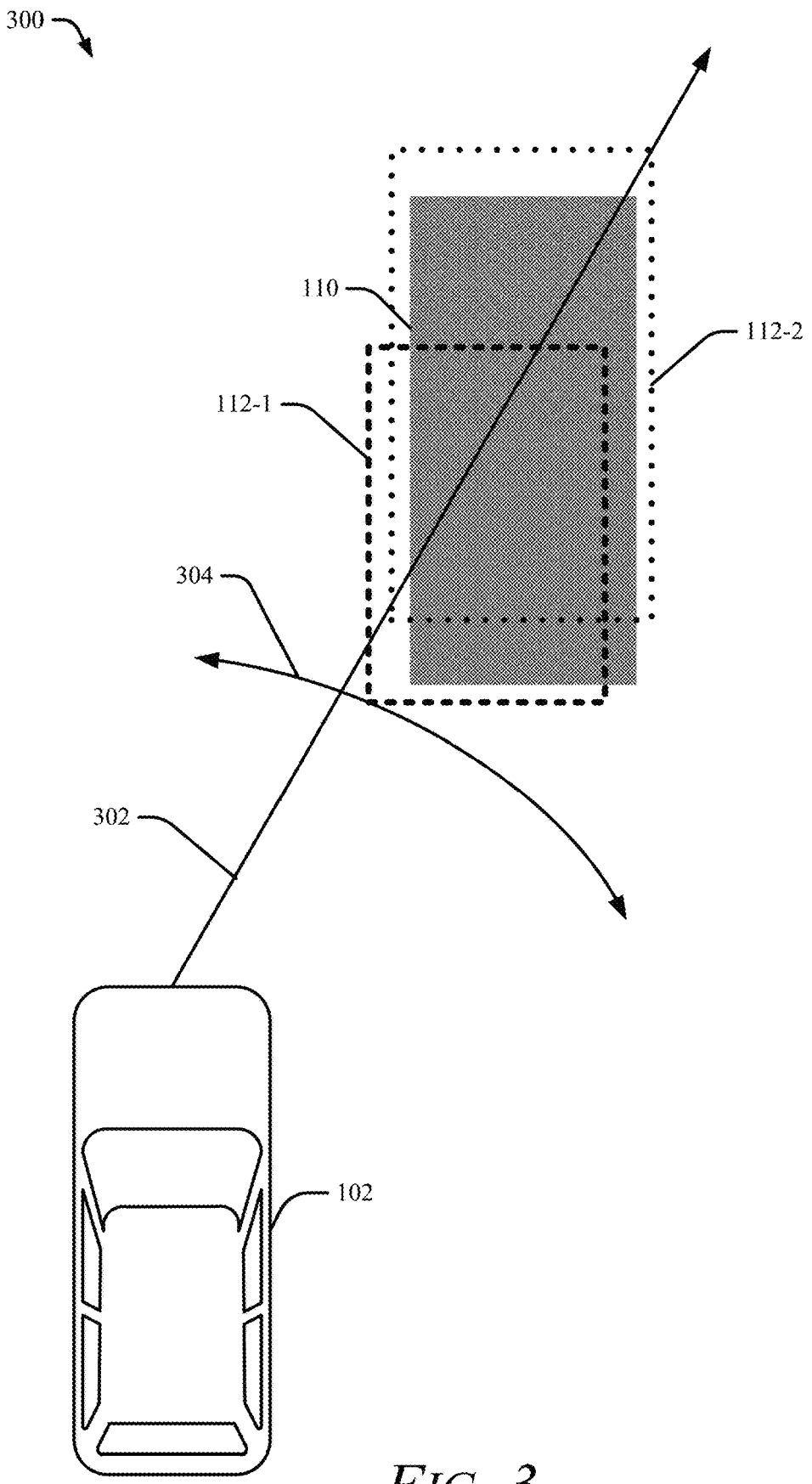
FIG. 3 illustrates the environment from FIG. 1-1, shown in more detail.

FIG. 3 illustrates the environment from FIG. 1-1, with a portion 300 shown in more detail. The fusion module 108 reports out information, relative to a reference point, which corresponds to an estimated point of collision between the vehicle 102 and the other vehicle 110 given their current trajectories. Note that for some fusion trackers, such as the fusion module 108-1, the reference point associated with each low-level track may be synchronized during fusion. That is, information reported by one low-level track is transformed and conveyed by the fusion module 108-1 relative to the reference point inferred for a counterpart low-level track. A vision angle 302 is depicted relative to the vehicle 102 and a radar range 304. Enlarged from FIG. 1, the bounding boxes 112-1, 112-2 clearly appear offset; each is derived either from radar data at the radar interface 106-1, or vision camera data at the vision camera interface 106-2. The bounding box 112-1 is at a different position than the bounding box 112-2; the cause of this offset is in the technology differences in how radar and vision cameras can perceive different parts of the same vehicle 110.

The fusion module 108-1 may apply additional fusion techniques to fuse the bounding boxes 112-1, 112-2 about a common reference point. The fusion module 108-1, therefore, seeks to synchronize the reference points of the low-level object-tracks to fuse the two data sources. The bounding box 112-1 is generated based on low-level radar-based object-tracks being reported relative some reference point, which may coincide with a predicted collision point between the vehicle 102 and an object represented by the bounding box 112-1. The bounding box 112-2 may be drawn relative to another reference point based on low-level vision-camera-based object-tracks.

The fusion module 108-1 transforms the information as reported by the radar and vision camera and used to create the bounding boxes 112-1, 112-2 to create fused information for producing a fused bounding box that replaces the bounding boxes 112-1, 112-2 at a fused reference point. Combining radar and vision camera into a fusion tracker provides very good azimuth angle estimations from the vision camera, while also offering an accurate range prediction about the reference point.

Figures 1, 4:
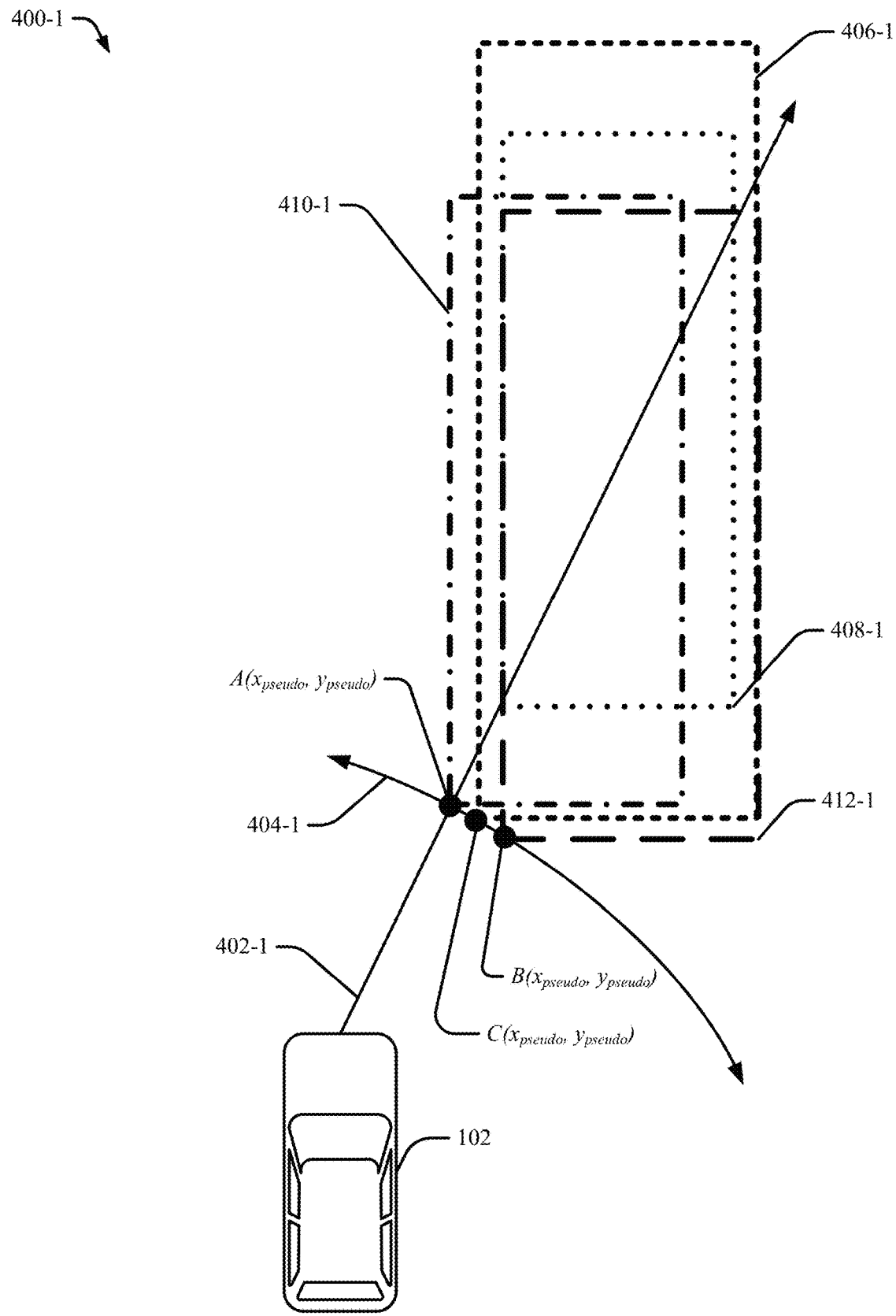
Figures 2, 4:
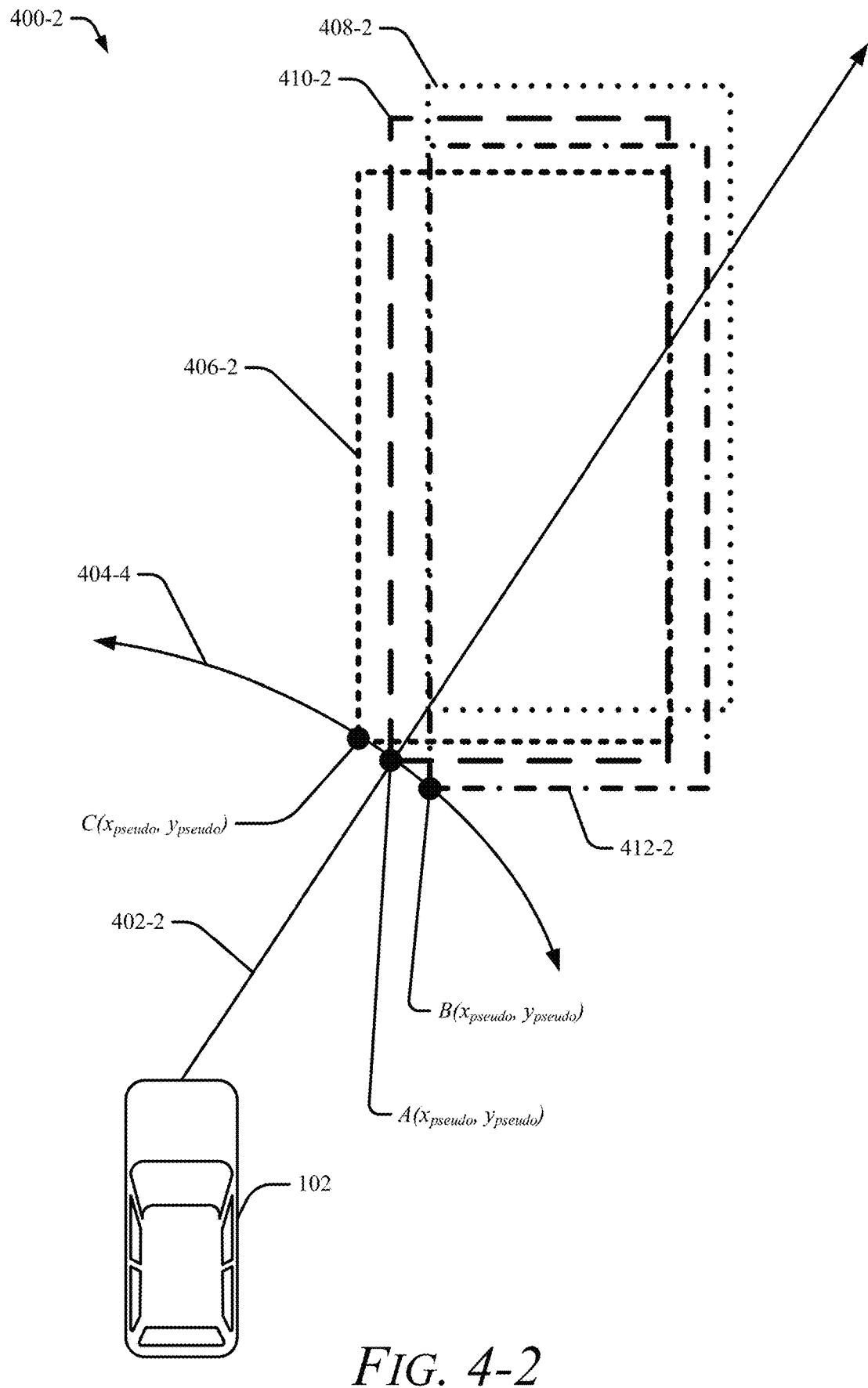

FIGS. 4-1 and 4-2 illustrate example pseudo bounding boxes defined under multiple hypothesis-based fusion of sensor data, in accordance with techniques of this disclosure. These pseudo bounding boxes may enable the fusion module 108-1 to resolve two otherwise offset bounding boxes to be about a common reference point, which improves accuracy in maneuvering the vehicle 102 to avoid a collision with the other vehicle 110.

FIG. 4-1 includes an environment 400-1, which is similar to the environment 100 in FIG. 1. The vehicle 102 has the other vehicle 110 (not shown) in its FOV. A vision angle 402-1 is reported at the vision camera interface 106-2; a radar range 404-1 is reported at the radar interface 106-1. A radar-based bounding box 406-1 is offset to the right and below a camera-based bounding box 408-1.

FIG. 4-2 includes an environment 400-2, which is likewise similar to the environment 100 in FIG. 1. The vehicle 102 has the other vehicle 110 (not shown) in its FOV A vision angle 402-2 is reported at the vision camera interface 106-2; a radar range 406-2 is reported at the radar interface 106-1. However, this time a radar-based bounding box 406-2 is offset to the right and above a camera-based bounding box 408-2.

As indicated above, the radar interface 106-1 may provide a radar range pseudo measurement. In addition, the vision camera interface 106-2 may report pseudo measurements that include a vision range, a vision angle, a lateral position, and a longitudinal position. The pseudo measurement from the radar interface 106-1 may be reliable most of the time; while some pseudo measurements obtained from a vision camera are more reliable than others. In a forward driving scenario, for example, the vision range and the longitudinal position are not likely to be accurate enough for repositioning a bounding box indicative of a fusion between radar and vision camera object-tracks. However, for purposes of evaluating whether a bounding box is accurate, a vision angle and a lateral position obtained from the vision camera interface 106-2 is reliable. As such, when considering repositioning of a fusion-based bounding box, the fusion module 108-1 may consider multiple combinations of pseudo measurement types, as outlined in the following Table 1:

TABLE 1

|  | Vision camera angle | Vision camera lateral position | No vision camera pseudo measurement |
| --- | --- | --- | --- |
| Radar Range | combination A | combination B | combination C |

Note, these are just some example combinations; other combinations of pseudo measurement types may be considered when other sensors or other types of pseudo measurements are available.

Turning first to FIG. 4-1, when considering combination A from the above table, the data type selector submodule 210-1 uses the radar range 404-1 and the vision camera angle 402-1 at an object-track's reference point to calculate a reference point of a pseudo bounding box 410-1. The data type selector submodule 210-1 selects the combination A as the pseudo measurement type that has a greater chance of being accurate than each other combination B and C of other pseudo measurement types. The combination A represents a first pseudo measurement derived from a radar range indicated by the one or more object-tracks from the plurality of first object-tracks and further derived from a vision angle inferred by the at least one object-track from the set of second object-tracks. A reference point $A(x_{pseudo}, y_{pseudo})$, in the Cartesian system, to the bounding box 410-1 is represented in the x-direction as a product between the radar range 404-1 and a cosine of the vision angle 402-1, and is represented in the y-direction as a product between the radar range 404-1 and a sine of the vision angle 402-1, as shown below in Equation 1:

$$A \begin{cases} x_{pseudo} = R_{radar} * \cos(\theta_{vision}) \\ y_{pseudo} = R_{radar} * \sin(\theta_{vision}) \end{cases} \quad \text{Equation 1}$$

Where, $x_{pseudo}, y_{pseudo}$ stand for the reference point position in Cartesian coordinate system on the pseudo bounding box 410-1, which is derived from radar and vision. The $R_{radar}$ represents the radar range 404-1 measurement to a reference point reported by the radar interface 106-1 and $\theta_{vision}$ is the vision angle 402-1, which is also the azimuth of the same reference point reported by the vision camera interface 106-2.

Switching to FIG. 4-2, when considering combination A from the above table, the data type selector submodule 210-1 uses the radar range and the vision camera angle at an object-track's reference point to calculate a reference point of a pseudo bounding box 410-2. The data type selector submodule 210-1 selects the combination A reference point $A(x_{pseudo}, y_{pseudo})$, in the Cartesian system, to the bounding box 410-2, which is represented in the x-direction as a product between the radar range 404-2 and a cosine of the vision angle 402-2, and is represented in the y-direction as a product between the radar range 404-2 and a sine of the vision angle 402-2, according to the Equation 1 and so $x_{pseudo}, y_{pseudo}$ is on the pseudo bounding box 410-2. The $R_{radar}$ represents the radar range 404-2 measurement to a reference point reported by the radar interface 106-1 and $\theta_{vision}$ is the vision angle 402-2.

Returning to FIG. 4-1, when considering combination B from the above table, the data type selector submodule 210-1 uses the radar range and the vision camera lateral position at an object-track's reference point to calculate a reference point of a pseudo bounding box 412-1. The data type selector submodule 210-1 selects the combination B as the pseudo measurement type that has a greater chance of being accurate than each other combination A and C of other pseudo measurement types. The combination B represents a second pseudo measurement derived from a radar range 404-1 indicated by the one or more object-tracks from the plurality of first object-tracks and further derived from a vision lateral position inferred by the at least one object-track from the set of second object-tracks. A reference point $B(x_{pseudo}, y_{pseudo})$, in the Cartesian system, to the bounding box 412-1 is represented in the x-direction as a square root of a difference between a square of the radar range 404-1 and a square of the vision lateral position, and is represented in the y-direction as a product the vision lateral position, as shown below in Equation 2:

$$B \begin{cases} x_{pseudo} = \sqrt{R_{radar}^2 - y_{vision}^2} \\ y_{pseudo} = y_{vision} \end{cases} \quad \text{Equation 2}$$

Where, $R_{radar}$ represents the radar range 404-2 pseudo measurement at the reference point reported by radar interface 106-1, and $y_{vision}$ is the lateral position, in Cartesian coordinate system, of the reference point reported by the vision camera interface 106-2.

Turning back to FIG. 4-2, when considering combination B from the above table, the data type selector submodule 210-1 uses the radar range and the vision lateral position at an object-track's reference point to calculate a reference point of a pseudo bounding box 412-2. The data type selector submodule 210-1 selects the combination B reference point $B(x_{pseudo}, y_{pseudo})$, in the Cartesian system, to the bounding box 412-2. The bounding box 412-2 is represented in the x-direction as a square root of a difference between a square of the radar range 404-2 and a square of the vision lateral position, and the bounding box 412-2 is represented in the y-direction as a product the vision lateral position, according to the Equation 2. The $R_{radar}$ represents the radar range 404-2 measurement reported by the radar interface 106-1 and $y_{vision}$ is the lateral position, in Cartesian coordinate system, of the reference point reported by the vision camera interface 106-2.

Lastly in this example, returning to FIG. 4-1, when considering combination C from the above table, the data type selector submodule 210-1 uses radar information including the radar range 404-1 at the radar interface 106-1, without considering any pseudo measurements from the vision camera interface 106-2. The data type selector submodule 210-1 selects combination C to be the pseudo measurement type that has a greater chance of being accurate than each other pseudo measurement type represented by the combinations A and B. The data type selector submodule 210-1 selects a third pseudo measurement, which is derived from radar information (including the radar range 404-1) indicated by the one or more object-tracks from the plurality of first object-tracks and not derived from either a vision angle or a vision lateral position inferred by the at least one object-track from the set of second object-tracks. A reference point C(x,y) in the Cartesian system to the bounding box is represented as having the same location as a bounding box 406-1 as reported by the radar interface 106-1, without considering the vision camera interface 106-2.

FIGS. 4-1 and 4-2 illustrate how a bounding box can be generated with different pseudo measurement types. Proper selection, by the data type selector submodule 210-1, of pseudo measurement type can aid in EKF filtering because an otherwise incorrect definition of a pseudo bounding box can lead to a bad estimation about an object being tracked. Because different pseudo measurement types are recommended for use under different tracking scenarios, a multiple hypotheses-based approach is taken by the data type selector submodule 210-1 to make decisions on pseudo measurement types.

It is assumed that a positional error covariance $\sigma_{Radar}$ of the radar interface 106-1 is known or if not known, can be derived empirically from experimenting and observing the radar interface 106-1, over time. Assume that the radar track position as $X_{Radar}=[x_r, y_r]^T$, and its error covariance $\sigma_{Radar}$ is in Equation 3:

$$\sigma_{Radar} = \begin{Bmatrix} \sigma_{xx} & \sigma_{xy} \\ \sigma_{xy} & \sigma_{yy} \end{Bmatrix} \quad \text{Equation 3}$$

Note that if only the radar range accuracy $\sigma_r$ and radar azimuth accuracy $\sigma_\theta$ is provided as additional pseudo measurements obtained at the radar interface 106-1, assuming the radar range accuracy $\sigma_r$ and radar azimuth accuracy $\sigma_\theta$ are independent, the position error covariance at Cartesian coordinate system could be derived as represented in Equation 4:

$$\sigma_p = \begin{bmatrix} \cos\theta & -r*\sin\theta \\ \sin\theta & r*\cos\theta \end{bmatrix} \begin{bmatrix} \sigma_r^2 & 0 \\ 0 & \sigma_\theta^2 \end{bmatrix} \begin{bmatrix} \cos\theta & \sin\theta \\ -r*\sin\theta & r*\cos\theta \end{bmatrix} \quad \text{Equation 4}$$

To determine a probability of each positional hypothesis (e.g., each combination A, B, C), a squared Mahalanobis distance between the reference point of the combinations A and B when compared to the reference point of the combination C, which is the position of the radar bounding box 406-1, 406-2, as shown in Equation 5.

$$d^2(X_H, X_{Radar}) = (X_H - X_{Radar})^T \sigma_{Radar}^{-1} (X_H - X_{Radar}) \quad \text{Equation 5}$$

$X_H$ is the reference point position defined by each combination A, B, or C. It is intuitive that larger the Mahalanobis distance is indicative of the corresponding pseudo measurement type having a smaller probability, which may provide a better estimation of performance. It is known that the squared Mahalanobis distance follows the chi-square distribution with 2 degrees of freedom, and its cumulative distribution is defined as Equation 6:

$$1-e^{-x/2} \quad \text{Equation 6}$$

When x is the squared Mahalanobis distance, the probabilities of combination A and combination B can be defined as the cumulative distribution of the 2-degree chi-square distribution from positive infinity to its squared Mahalanobis distance, which is:

$$\begin{cases} P_A = e^{-d^2(X_{A^*}, X_{Radar})/2} \\ P_B = e^{-d^2(X_{B^*}, X_{Radar})/2} \end{cases} \quad \text{Equation 7}$$

Note that combinations A and B are not independent, so that the probably of combination C, which is the radar-only pseudo measurement type can be defined as:

$$P_C = 1 - (P_A + P_B - P(A,B)) \quad \text{Equation 8}$$

The joint probability of combination A and combination B can be defined through Bayes Theorem, as shown in Equation 9:

$$P(A,B) = P_A * P(B|A) \quad \text{Equation 9}$$

The conditional distribution of the combination B measurement type given the combination A is accurate, and can be defined as:

$$P(B|A) = e^{-d^2(X_B, X_A)/2} \quad \text{Equation 10}$$

The squared Mahalanobis distance using Equation 10, is defined as follows:

$$d^2(X_B, X_A) = (X_B - X_A)^T \sigma_{Radar}^{-1} (X_B - x_A) \quad \text{Equation 11}$$

Therefore, the probably of the 'Radar-only' pseudo measurement type can be further derived as:

$$P_C = 1 - e^{-d^2(X_A, X_{Radar})/2} - e^{-d^2(X_B, X_{Radar})/2} + e^{-d^2(X_A, X_{Radar})/2} * e^{-d^2(X_B, X_A)/2}$$

$$= 1 - e^{-d^2(X_A, X_{Radar})/2} - e^{-d^2(X_B, X_{Radar})/2} + e^{-[d^2(X_A, X_{Radar}) + d^2(X_B, X_A)]/2} \quad \text{Equation 12}$$

With the probability values for each hypothesis well defined using Equations 1-12, the fusion module 108-1 can fuse sensor data from the multiple interfaces 106 using the most accurate of the three combinations A, B, and C, of pseudo measurement types, for a particular situation.

Example Methods

Figure 5:
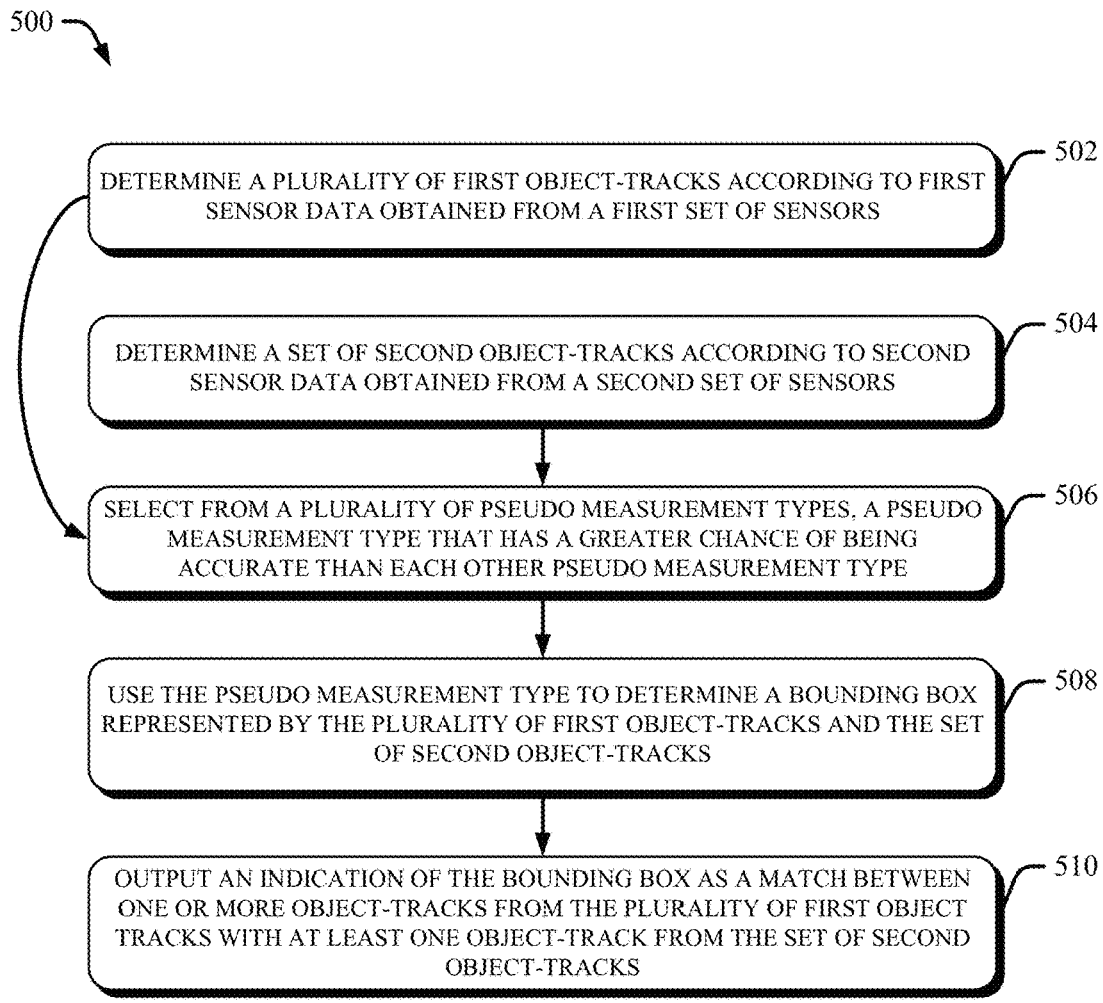
FIG. 5 illustrates an example method for multiple hypothesis-based fusion of sensor data, in accordance with techniques of this disclosure.

FIG. 5 illustrates an example method for multiple hypothesis-based fusion of sensor data, in accordance with techniques of this disclosure. The method 500 is shown as a set of operations (or acts) performed in, but not limited to, the order or combinations in which the operations are shown or described. Further, any of the operations may be repeated, combined, or reorganized to provide other methods. In portions of the following discussion, reference may be made to the previously introduced figures, in describing some non-limiting examples of the method 500.

At 502, a plurality of first candidate object-tracks are determined according to first sensor data obtained from a first set of sensors. Each object-track from the plurality of first candidate object-tracks may be associated with at least a portion of a stationary object or a portion of a moving object, such as the vehicle 110.

At 504, a set of second object-tracks are determined according to second sensor data obtained from a second set of sensors. In some examples, the first set of sensors include one or more radar sensors, lidar sensors, or ultrasound sensors and the second set of sensors include one or more visual sensors including optical cameras or infrared cameras.

At 506, a pseudo measurement type that has a greater chance of being accurate than each other pseudo measurement type is selected from a plurality of pseudo measurement types. The fusion module 108-1 selects, based on a first probability, a second probability, and a third probability, a pseudo measurement type that has a greater chance of being accurate when compared against two other pseudo measurement types. For example, the data type selector submodule 210-2 may determine a first probability of a first pseudo measurement derived from a radar range indicated by the one or more object-tracks from the plurality of first object-tracks and further derived from a vision angle inferred by at least one object-track from the set of second object-tracks. The data type selector submodule 210-2 may determine a second probability of a second pseudo measurement derived from the radar range and further derived from a vision lateral position inferred by the at least one object-track from the set of second object-tracks. The data type selector submodule 210-2 may determine a third probability of a third pseudo measurement derived from radar information including the radar range and not further derived from the vision angle or the vision lateral position. The fusion module 108-1 selects the pseudo measurement type associated with the greater of the first, the second, and the third probabilities.

At 508, the selected pseudo measurement type is used to determine a bounding box represented by the plurality of first object-tracks and the set of second object-tracks. In some examples, selecting the pseudo measurement type that has a greater chance of being accurate than each other pseudo measurement type from the plurality of pseudo measurement types includes selecting the pseudo measurement type based on a history of pseudo measurement types selected during previous update cycles. For example, the pseudo measurement type may be kept fixed until a pattern emerges. With a history of selecting a particular pseudo measurement type, the fusion module 108-1 gains confidence that the selected pseudo measurement is correct and should be used.

At 506, an indication of the bounding box is output as a match between one or more object-tracks from the plurality of first object-tracks with at least one object-track from the set of second object-tracks.

ADDITIONAL EXAMPLES

In the following section, additional examples of multiple hypothesis-based fusion of sensor data are provided.

Example 1. A method comprising: determining, by a sensor-fusion system, a plurality of first object-tracks according to first sensor data obtained from a first set of sensors; determining, by the sensor-fusion system, a set of second object-tracks according to second sensor data obtained from a second set of sensors; selecting, from a plurality of pseudo measurement types, a pseudo measurement type that has a greater chance of being accurate than each other pseudo measurement type from the plurality of pseudo measurement types, the selecting based at least in part on a predefined error covariance associated with the first set of sensors; using the pseudo measurement type to determine a bounding box represented by the plurality of first object-tracks and the set of second object-tracks; and outputting an indication of the bounding box as a match between one or more object-tracks from the plurality of first object-tracks with at least one object-track from the set of second object-tracks.

Example 2. The method of any preceding example, wherein the first set of sensors are different than the second set of sensors.

Example 3. The method of any preceding example, wherein the first set of sensors comprise one or more radar sensors, lidar sensors, or ultrasound sensors and the second set of sensors comprise one or more visual sensors including optical cameras or infrared cameras.

Example 4. The method of any of the preceding examples, wherein selecting the pseudo measurement type that has a greater chance of being accurate than each other pseudo measurement type from the plurality of pseudo measurement types comprises selecting a first pseudo measurement derived from a radar range indicated by the one or more object-tracks from the plurality of first object-tracks and further derived from a vision angle inferred by the at least one object-track from the set of second object-tracks.

Example 5. The method of example 4, wherein a reference point (x,y) in the Cartesian system to the bounding box is represented in the x-direction as a product between the radar range and a cosine of the vision angle, and is represented in the y-direction as a product between the radar range and a sine of the vision angle.

Example 6. The method of any of the preceding examples, wherein selecting the pseudo measurement type that has a greater chance of being accurate than each other pseudo measurement type from the plurality of pseudo measurement types comprises selecting a second pseudo measurement derived from a radar range indicated by the one or more object-tracks from the plurality of first object-tracks and further derived from a vision lateral position inferred by the at least one object-track from the set of second object-tracks.

Example 7. The method of example 6, wherein a reference point (x,y) in the Cartesian system to the bounding box is represented in the x-direction as a square root of a difference between a square of the radar range and a square of the vision lateral position, and is represented in the y-direction as a product the vision lateral position.

Example 8. The method of any of the preceding examples, wherein selecting the pseudo measurement type that has a greater chance of being accurate than each other pseudo measurement type from the plurality of pseudo measurement types comprises selecting a third pseudo measurement derived from radar information including a radar range indicated by the one or more object-tracks from the plurality of first object-tracks and not derived from either a vision angle or a vision lateral position inferred by the at least one object-track from the set of second object-tracks.

Example 9. The method of example 8, wherein a reference point (x,y) in the Cartesian system to the bounding box is represented in the y-direction as the radar range.

Example 10. The method of any of the preceding examples, wherein selecting the pseudo measurement type that has a greater chance of being accurate than each other pseudo measurement type from the plurality of pseudo measurement types comprises: determining a first probability of a first pseudo measurement derived from a radar range indicated by the one or more object-tracks from the plurality of first object-tracks and further derived from a vision angle inferred by the at least one object-track from the set of second object-tracks; determining a second probability of a second pseudo measurement derived from the radar range and further derived from a vision lateral position inferred by the at least one object-track from the set of second object-tracks; determining a third probability of a third pseudo measurement derived from radar information indicated by the one or more object-tracks from the plurality of first object-tracks, the radar information including the radar range, the third pseudo measurement not further derived from the vision angle or the vision lateral position.

Example 11. The method of any of the preceding examples, further comprising: determining the error covariance associated with the first set of sensors.

Example 12. The method of any of the preceding examples, wherein selecting the pseudo measurement type that has a greater chance of being accurate than each other pseudo measurement type from the plurality of pseudo measurement types comprises selecting the pseudo measurement type based on a history of selecting the pseudo measurement type based on previous frames of the first and second sensor data.

Example 13. A system, the system comprising: a processor configured to perform the method of any of the preceding examples.

Example 14. The system of example 13, further comprising a vehicle, the vehicle comprising the processor.

Example 15. A system comprising means for performing the method of any of the preceding examples.

Example 16. A non-transitory computer-readable storage medium comprising instructions that, when executed, configured at least one processor of a system to execute the method of any of the preceding examples.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. Problems associated with combinatorial explosion can occur in other systems that resolve assignment problem where a quantity of agents or tasks is large. Therefore, although described as a way to improve vehicle based matching techniques, the techniques of the foregoing description can be applied to other assignment problems to reduce a total number of assignments between tasks and agents.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   determining, by a sensor-fusion system, a plurality of first object-tracks according to first sensor data obtained from a first set of sensors;
   determining, by the sensor-fusion system, a set of second object-tracks according to second sensor data obtained from a second set of sensors;
   selecting, from a plurality of pseudo measurement types, a pseudo measurement type that has a greater chance of being accurate than each other pseudo measurement type from the plurality of pseudo measurement types, the selecting based at least in part on a predefined error covariance associated with the first set of sensors;
   using the pseudo measurement type to determine a bounding box represented by the plurality of first object-tracks and the set of second object-tracks;
   outputting an indication of the bounding box as a match between one or more object-tracks from the plurality of first object-tracks with at least one object-track from the set of second object-tracks;
   wherein selecting the pseudo measurement type that has a greater chance of being accurate than each other pseudo measurement type from the plurality of pseudo measurement types comprises:
      determining a first probability of a first pseudo measurement derived from a radar range indicated by the one or more object-tracks from the plurality of first object-tracks and further derived from a vision angle inferred by the at least one object-track from the set of second object-tracks;
      determining a second probability of a second pseudo measurement derived from the radar range and further derived from a vision lateral position inferred by the at least one object-track from the set of second object-tracks;
      determining a third probability of a third pseudo measurement derived from radar information indicated by the one or more object-tracks from the plurality of first object-tracks, the radar information including the radar range, the third pseudo measurement not further derived from the vision angle or the vision lateral position; and
   selecting, based on the first, second, and third probability, the pseudo measurement type that has the greater chance of being accurate.

2. The method of claim 1, wherein the first set of sensors are different than the second set of sensors.

3. The method of claim 1, wherein the first set of sensors comprise one or more radar sensors, lidar sensors, or ultrasound sensors and the second set of sensors comprise one or more visual sensors including optical cameras or infrared cameras.

4. The method of claim 1, wherein selecting the pseudo measurement type that has the greater chance of being accurate than each other pseudo measurement type from the plurality of pseudo measurement types comprises selecting the first pseudo measurement derived from the radar range indicated by the one or more object-tracks from the plurality of first object-tracks and further derived from the vision angle inferred by the at least one object-track from the set of second object-tracks.

5. The method of claim 4, wherein a reference point (x,y) to the bounding box is represented in an x-direction as a product between the radar range and a cosine of the vision angle, and is represented in a y-direction as a product between the radar range and a sine of the vision angle.

6. The method of claim 1, wherein selecting the pseudo measurement type that has the greater chance of being accurate than each other pseudo measurement type from the plurality of pseudo measurement types comprises selecting the second pseudo measurement derived from the radar range indicated by the one or more object-tracks from the plurality of first object-tracks and further derived from the vision lateral position inferred by the at least one object-track from the set of second object-tracks.

7. The method of claim 6, wherein a reference point (x,y) to the bounding box is represented in an x-direction as a square root of a difference between a square of the radar range and a square of the vision lateral position, and is represented in a y-direction as a product the vision lateral position.

8. The method of claim 1, wherein selecting the pseudo measurement type that has the greater chance of being accurate than each other pseudo measurement type from the plurality of pseudo measurement types comprises selecting the third pseudo measurement derived from radar information including the radar range indicated by the one or more object-tracks from the plurality of first object-tracks and not derived from either the vision angle or the vision lateral position inferred by the at least one object-track from the set of second object-tracks.

9. The method of claim 8, wherein a reference point (x,y) to the bounding box is represented in a y-direction as the radar range.

10. The method of claim 1, further comprising:
determining the error covariance associated with the first set of sensors.

11. The method of claim 1, wherein selecting the pseudo measurement type that has the greater chance of being accurate than each other pseudo measurement type from the plurality of pseudo measurement types comprises selecting the pseudo measurement type based on a history of pseudo measurement types selected based on previous frames of the first and second sensor data.

12. A system, the system comprising:
a processor configured to:
determine a plurality of first object-tracks according to first sensor data obtained from a first set of sensors;
determine a set of second object-tracks according to second sensor data obtained from a second set of sensors;
select, from a plurality of pseudo measurement types, a pseudo measurement type that has a greater chance of being accurate than each other pseudo measurement type from the plurality of pseudo measurement types, the selecting based at least in part on a predefined error covariance associated with the first set of sensors;
use the pseudo measurement type to determine a bounding box represented by the plurality of first object-tracks and the set of second object-tracks;
output an indication of the bounding box as a match between one or more object-tracks from the plurality of first object-tracks with at least one object-track from the set of second object-tracks;
wherein the processor is further configured to select the pseudo measurement type that has a greater chance of being accurate than each other pseudo measurement type from the plurality of pseudo measurement types by at least selecting a first pseudo measurement derived from a radar range indicated by the one or more object-tracks from the plurality of first object-tracks and further derived from a vision angle inferred by the at least one object-track from the set of second object-tracks; and
wherein a reference point (x,y) to the bounding box is represented in an x-direction as a product between the radar range and a cosine of the vision angle, and is represented in a y-direction as a product between the radar range and a sine of the vision angle.

13. The system of claim 12, further comprising:
a vehicle, the vehicle comprising the processor.

14. The system of claim 12, wherein the first set of sensors are different than the second set of sensors.

15. The system of claim 12, wherein the first set of sensors comprise one or more radar sensors, lidar sensors, or ultrasound sensors and the second set of sensors comprise one or more visual sensors including optical cameras or infrared cameras.

16. The system of claim 12, wherein the processor is further configured to select the pseudo measurement type that has the greater chance of being accurate than each other pseudo measurement type from the plurality of pseudo measurement types by at least selecting the second pseudo measurement derived from the radar range indicated by the one or more object-tracks from the plurality of first object-tracks and further derived from the vision lateral position inferred by the at least one object-track from the set of second object-tracks.

17. A non-transitory computer-readable storage medium comprising instructions that, when executed, configure at least one processor of a system to:
determine a plurality of first object-tracks according to first sensor data obtained from a first set of sensors;
determine a set of second object-tracks according to second sensor data obtained from a second set of sensors;
select, from a plurality of pseudo measurement types, a pseudo measurement type that has a greater chance of being accurate than each other pseudo measurement type from the plurality of pseudo measurement types, the selecting based at least in part on a predefined error covariance associated with the first set of sensors;
use the pseudo measurement type to determine a bounding box represented by the plurality of first object-tracks and the set of second object-tracks; and
output an indication of the bounding box as a match between one or more object-tracks from the plurality of first object-tracks with at least one object-track from the set of second object-tracks;
wherein the processor is further configured to select the pseudo measurement type that has a greater chance of being accurate than each other pseudo measurement type from the plurality of pseudo measurement types by at least selecting a first pseudo measurement derived from a radar range indicated by the one or more object-tracks from the plurality of first object-tracks and further derived from a vision angle inferred by the at least one object-track from the set of second object-tracks; and
wherein a reference point (x,y) to the bounding box is represented in an x-direction as a product between the radar range and a cosine of the vision angle, and is represented in a y-direction as a product between the radar range and a sine of the vision angle.

* * * * *